US011922860B2

(12) United States Patent
Hwang et al.

(10) Patent No.: US 11,922,860 B2
(45) Date of Patent: Mar. 5, 2024

(54) PIXEL AND DISPLAY APPARATUS OF WHICH STATIC POWER CONSUMPTION IS REDUCED

(71) Applicant: Sapien Semiconductors Inc., Seoul (KR)

(72) Inventors: Sung Ho Hwang, Seoul (KR); Ji Han Kim, Seoul (KR); Ji Haeng Lee, Seoul (KR); Hye Min Bae, Seoul (KR); Dae Young Jung, Seoul (KR)

(73) Assignee: Sapien Semiconductors Inc., Seoul (KR)

( * ) Notice: Subject to any disclaimer, the term of this patent is extended or adjusted under 35 U.S.C. 154(b) by 0 days.

(21) Appl. No.: 17/946,601

(22) Filed: Sep. 16, 2022

(65) Prior Publication Data

US 2023/0360587 A1 Nov. 9, 2023

(30) Foreign Application Priority Data

May 6, 2022 (KR) ........................ 10-2022-0055973
Jun. 23, 2022 (KR) ........................ 10-2022-0076549

(51) Int. Cl.
*G09G 3/3216* (2016.01)
*G09G 3/20* (2006.01)
*G09G 3/32* (2016.01)

(52) U.S. Cl.
CPC ......... *G09G 3/32* (2013.01); *G09G 2330/021* (2013.01)

(58) Field of Classification Search
CPC .................................................... G09G 3/3233
See application file for complete search history.

(56) References Cited

U.S. PATENT DOCUMENTS

| | | | | |
|---|---|---|---|---|
| 2005/0078076 A1* | 4/2005 | Kim | G09G 3/3677 | 345/98 |
| 2005/0225683 A1* | 10/2005 | Nozawa | G09G 3/3258 | 348/801 |
| 2010/0066714 A1* | 3/2010 | Ozaki | G09G 3/2081 | 345/207 |
| 2016/0267837 A1* | 9/2016 | Wang | G09G 3/3225 | |
| 2017/0092178 A1* | 3/2017 | Lee | G09G 3/3275 | |

FOREIGN PATENT DOCUMENTS

| | | |
|---|---|---|
| KR | 102220960 B1 | 2/2021 |
| KR | 20210053821 A | 5/2021 |

OTHER PUBLICATIONS

Action issued in the Korean Patent Office in Korean Application No. 10-2022-0076549 dated Sep. 13, 2023.

* cited by examiner

*Primary Examiner* — Nan-Ying Yang
(74) *Attorney, Agent, or Firm* — Sughrue Mion, PLLC

(57) ABSTRACT

Provided is a pixel driving circuit including a first circuit configured to control, in a data writing mode, a signal related to driving of one or more light-emitting elements, and a second circuit configured to supply, in a driving mode, power to the one or more light-emitting elements based on a signal transmitted from the first circuit.

2 Claims, 12 Drawing Sheets

| Cap data | # of Refresh |
|---|---|
| 000 | All times |
| 001 | 1 times |
| 010 | 2 times |
| 011 | 3 times |
| 100 | 4 times |
| 101 | 5 times |
| 110 | 6 times |
| 111 | 7 times |

PIXEL AND DISPLAY APPARATUS OF WHICH STATIC POWER CONSUMPTION IS REDUCED

CROSS-REFERENCE TO RELATED APPLICATION

This application is based on and claims priority under 35 USC § 119 to Korean Patent Application No. 10-2022-0055973, filed on May 6, 2022 and No. 10-2022-0076549, filed on Jun. 23, 2022 in the Korean Intellectual Property Office, the disclosure of which is incorporated by reference herein in its entirety.

BACKGROUND

1. Field

The disclosure relates to a pixel included in a display apparatus, and more particularly, to a pixel with reduced static power consumption.

2. Description of the Related Art

A typical display apparatus includes a plurality of pixels, and M*N pixels arranged therein. Each pixel may include one or more light-emitting elements, and typically includes three light-emitting elements (R, G, B). Each light-emitting element is called a sub-pixel.

One of various methods of controlling the driving of sub-pixels is a pulse width modulation (PWM) control method in which video data is stored in a built-in memory, the video data being used to control emission of sub-frames during a single frame, and gradation is controlled through a PWM signal. For PWM control, a pixel driving circuit for driving each pixel may be implemented using a transistor, but may be divided into a digital circuit and an analog circuit according to an operation region of the transistor.

The digital circuit operates in a cut off region and a non-saturation region respectively corresponding to On and Off to express '0' and '1.' On the other hand, analog circuits such as an amplifier or bias (except analog switches) operate in a saturation region, and accordingly, a constant current needs to be continuously consumed during the operation time of the circuit. The same power may not always be required depending on a display driving mode or screen, and thus, a way of reducing static power consumption in the pixel driving circuit is required.

The background art described above is technique that the inventor had to derive the disclosure or technical information acquired during the process of deriving the same, and is not necessarily a technique known to the general public prior to the filing of the disclosure.

SUMMARY

One or more embodiments provide a low-power pixel driving circuit. The problem to be solved by the disclosure is not limited to that mentioned above, and other objectives and advantages of the disclosure that are not mentioned can be understood from the following description, and more clearly understood in view of the embodiments of the disclosure. In addition, it will be obvious that the objectives and advantages to be solved by the disclosure can be implemented by means and combinations thereof indicated in the claims.

Additional aspects will be set forth in part in the description which follows and, in part, will be apparent from the description, or may be learned by practice of the presented embodiments of the disclosure.

A pixel driving circuit according to a first aspect of the disclosure includes a first circuit configured to control, in a data writing mode, a signal related to driving of one or more light-emitting elements, and a second circuit configured to supply, in a driving mode, power to the one or more light-emitting elements based on a signal transmitted from the first circuit.

A display apparatus according to a second aspect of the disclosure includes a display panel including an array of a plurality of pixel driving circuits forming rows and columns, a scan driving circuit configured to sequentially output row signals to pixel driving circuits arranged in a row direction in the array included in the display panel, and a data driving circuit configured to output column signals related to driving of light-emitting elements respectively corresponding to the plurality of pixel driving circuits, to pixel driving circuits arranged in a column direction in the array included in the display panel, wherein each of the plurality of pixel driving circuits includes the pixel driving circuit according to the first aspect.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
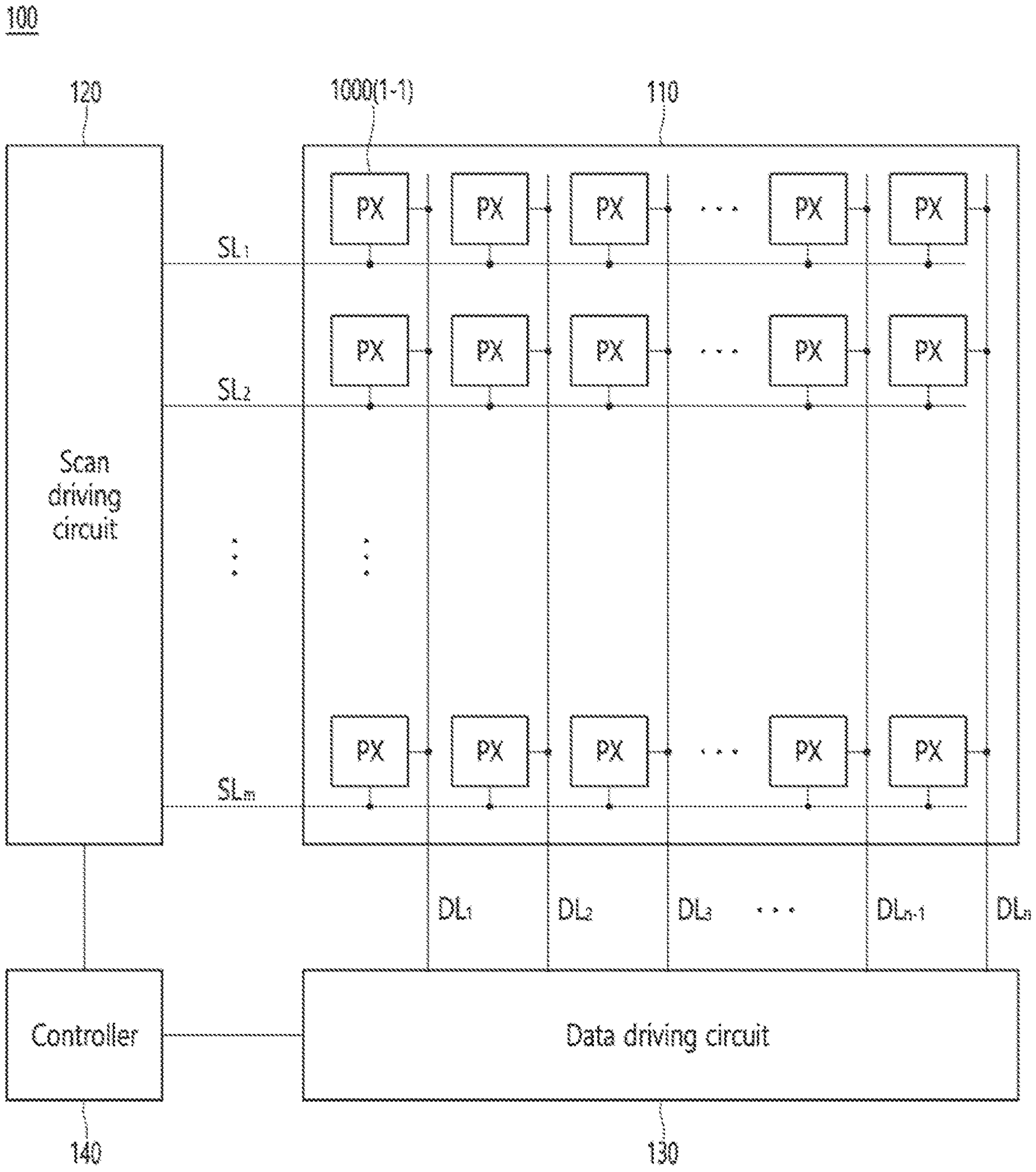
FIG. 1 is a display apparatus including a plurality of pixel driving circuits, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. The embodiments are merely described below, by referring to the figures, to explain aspects. As used herein, the term "and/or" includes any and all combinations of one or more of the associated listed items. Expressions such as "at least one of" when preceding a list of elements, modify the entire list of elements and do not modify the individual elements of the list.

The advantages and features of the disclosure and methods of achieving the advantages and features will be described more fully with reference to the accompanying drawings, in which embodiments of the disclosure are shown. The disclosure may, however, be embodied in many different forms and should not be construed as being limited to the embodiments set forth herein, and it is to be appreciated that all changes, equivalents, and substitutes that do not depart from the spirit and technical scope of the disclosure are encompassed in the disclosure. Rather these embodiments are provided so that this disclosure will be thorough and complete, and will fully convey the concept of the disclosure to one of ordinary skill in the art. In the description of the disclosure, certain detailed explanations of related art are omitted when it is deemed that they may unnecessarily obscure the essence of the disclosure.

The terms used in the embodiments are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

The terms used in the present specification are merely used to describe particular embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In the present description, terms including ordinal numbers such as 'first,' 'second,' etc. are used to describe various elements but the elements should not be defined by these terms. The terms are used only for distinguishing one element from another element.

In the following embodiments, "ON" used in connection with an element state may refer to an activated state of an element, and "OFF" may refer to a deactivated state of the element. As used in connection with a signal received by an element, "on" may refer to a signal that activates the element, and "off" may refer to a signal that deactivates the element. An element may be activated by a relatively high voltage or a relatively low voltage. For example, a P-type transistor may be activated by a relatively low voltage. An N-type transistor is activated by a relatively high voltage. Accordingly, it should be noted that an "on" voltage for a P-type transistor and that for an N-type transistor are opposite voltage levels to each other (low versus high).

When an element is referred to as being "connected to" another element, it may be construed that the element is connected to the other element not only directly but also through another element therebetween. Hereinafter, embodiments of the disclosure will be described in detail with reference to the accompanying drawings.

FIG. 1 is a display apparatus including a plurality of pixel driving circuits, according to an embodiment.

Referring to FIG. 1, a display apparatus 100 according to an embodiment may include a display panel 110, a scan driving circuit 120, a data driving circuit 130, and a controller 140.

In the disclosure, the display panel 110 may include a plurality of pixels PX. In an embodiment, the plurality of pixels PX may be configured in a matrix form in which M*N (M and N are natural numbers) pixels are arranged. However, the arrangement of the plurality of pixels PX may be in various patterns such as a zigzag type, according to another embodiment.

In the disclosure, the display panel 110 may be implemented using one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electroluminescent display (ELD), a vacuum fluorescent display (VFD), and other types of flat panel displays or flexible displays. In the disclosure, the display panel 110 will be described as being implemented as an LED display as an example.

In the disclosure, each of the plurality of pixels PX may include one or more light-emitting elements. In an embodiment, the light-emitting element may include an LED. The LED may include a micro LED having a size of 80 μm or less. In an embodiment, one pixel PX may output various colors through a plurality of light-emitting elements having different colors. As an example, one pixel PX may include a light-emitting element composed of red, green, and blue colors. As another example, one pixel PX may further include a white light-emitting element, and the white light-emitting element may replace any one of the red, green, and blue light-emitting elements. As another example, one pixel PX may include one white light-emitting element. In an embodiment in which a plurality of light-emitting elements are included in one pixel PX, each light-emitting element included in one pixel PX may be referred to as a 'sub-pixel.'

In the disclosure, each pixel PX may include a pixel driving circuit for driving a light-emitting element included in the pixel, that is, a sub-pixel. In the disclosure, the pixel driving circuit may drive a turn-on or turn-off operation of a sub-pixel by a signal output from the scan driving circuit 120 and/or the data driving circuit 130. In an embodiment, the pixel driving circuit may include at least one transistor, at least one capacitor, and the like. In an embodiment, the pixel driving circuit may be implemented by a stacked structure on a semiconductor wafer.

In the disclosure, the display panel 110 may include one or more scan lines $SL_1$ to $SL_m$ arranged in a row direction and one or more data lines $DL_1$ to $DL_n$ arranged in a column direction. In the disclosure, the pixel PX may be located at an intersection of the one or more scan lines $SL_1$ to $SL_m$ and the one or more data lines $DL_1$ to $DL_n$. Each pixel PX may be connected to any one scan line $SL_k$ and any one data line $DL_k$. The one or more scan lines $SL_1$ to $SL_m$ may be connected to the scan driving circuit 120, and the one or more data lines $DL_1$ to $DL_n$ may be connected to the data driving circuit 130.

In the disclosure, the scan driving circuit 120 may output a signal for driving one or more pixels connected to any one of the one or more scan lines $SL_1$ to $SL_m$ (hereinafter, a row signal). The scan driving circuit 120 may sequentially select the one or more scan lines $SL_1$ to $SL_m$. For example, a pixel connected to a first scan line $SL_1$ may be driven during a first scan driving period, and a pixel connected to a second scan line $SL_2$ may be driven during a second scan driving period. The operation of the scan driving circuit 120 according to the disclosure will be described in detail later.

In the disclosure, the data driving circuit 130 may output a signal related to gradation (hereinafter, a column signal) to each pixel through the one or more data lines $DL_1$ to $DL_n$. Although one data line is connected to one or more pixels in a longitudinal direction, a signal related to gradation may be input only to pixels connected to a scan line selected by the scan driving circuit 120. The operation of the data driving circuit 130 according to the disclosure will be described in detail later.

In the disclosure, the controller 140 may output a control signal to perform the operations of the scan driving circuit 120 and the data driving circuit 130. The controller 140 may output a control signal corresponding to image data corresponding to one image frame, to the scan driving circuit 120 or the data driving circuit 130.

Figure 2:
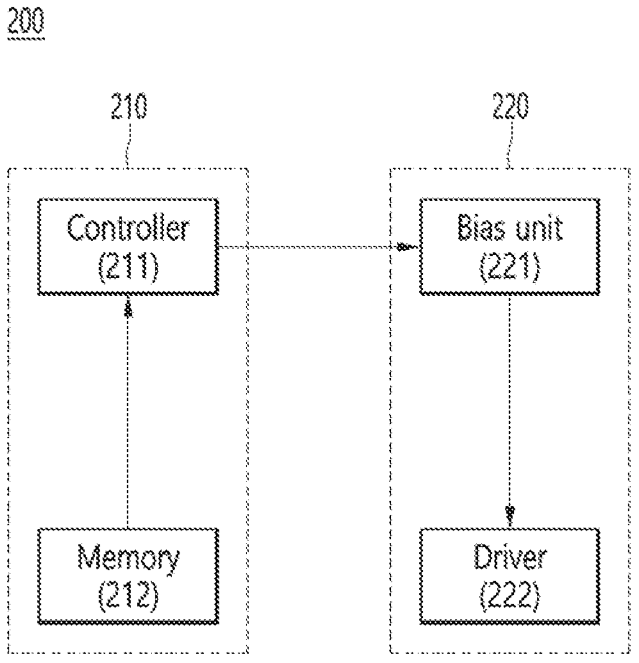
FIG. 2 is a block diagram schematically illustrating a pixel driving circuit according to an embodiment.

FIG. 2 is a block diagram schematically illustrating a pixel driving circuit according to an embodiment.

Referring to FIG. 2, a pixel driving circuit 200 according to the disclosure may include a first circuit 210 and a second circuit 220. In the disclosure, the first circuit 210 may also be referred to as a digital circuit, and may operate in a data writing mode. In the disclosure, the second circuit 220 may also be referred to as an analog circuit, and may operate in a driving mode.

Although not showed in FIG. 2, the pixel driving circuit 200 according to the disclosure may include terminals VCC, GND for receiving power, terminals R, G, B for outputting an emission control signal to one or more light-emitting elements, a terminal ROW for receiving a row signal output from the scan driving circuit 120, and a terminal COL for receiving a column signal output from the data driving circuit 130. It will be obvious to one of ordinary skill in the art that electrical connections may be configured such that power and signals may be input or output through the terminals described above.

In an embodiment, the first circuit 210 may include a controller 211 and a memory 212. As described above, the first circuit 210 may operate in a data writing mode.

In an embodiment, the memory 212 may be configured to store data related to the control of a pixel or a light-emitting element according to the disclosure. In an embodiment, the memory 212 may include a video memory (not shown) and a charging control memory (not shown). The video memory may store data related to driving of one or more light-emitting elements, that is, video data. The video data stored in the video memory may refer to data related to gradation at which a light-emitting element emits light during one frame or one pulse width modulation (PWM) cycle. The charging control memory may store capacitor data related to charging of a capacitor included in a driver 222 to be described later. The operation of the memory according to the disclosure will be described in detail later.

In an embodiment, the controller 211 may control the operation of the capacitor included in the driver 222. In an embodiment, the controller 211 may control whether to charge the capacitor, based on capacitor data stored in the charging control memory. The operation of the capacitor according to the disclosure will be described in detail later.

In an embodiment, the second circuit 220 may include a bias unit 221 and the driver 222. As described above, the second circuit 220 may operate in the driving mode.

In an embodiment, the driver 222 may control to supply power to one or more light-emitting elements based on data stored in the memory 212. In detail, the driver 222 may supply power to one or more light-emitting elements based on video data stored in the video memory. In an embodiment, the driver 222 may be configured to control the power supply of a light-emitting element according to a PWM driving method, and as the PWM driving method is a technique known to those skilled in the art, a detailed description thereof will be omitted.

In an embodiment, the bias unit 221 may supply bias power to the driver 222. In order to supply bias power, the bias unit 221 may be connected to a terminal VCC for receiving power. The operation of the bias unit according to the disclosure will be described in detail later.

The pixel driving circuit 200 according to the disclosure may further include a power generator (not shown). The power generator may output a reference voltage VDD to the memory 212, based on a row signal output from the scan driving circuit 120 and a column signal output from the data driving circuit 130. The configuration and operation of the power generator according to the disclosure will be described later.

The pixel driving circuit 200 according to the disclosure may further include a reset unit (not shown) that outputs a reset signal RSTB for initializing data stored in the memory 212, to the memory 212. The configuration and operation of the reset unit according to the disclosure will be described later.

Figure 3:
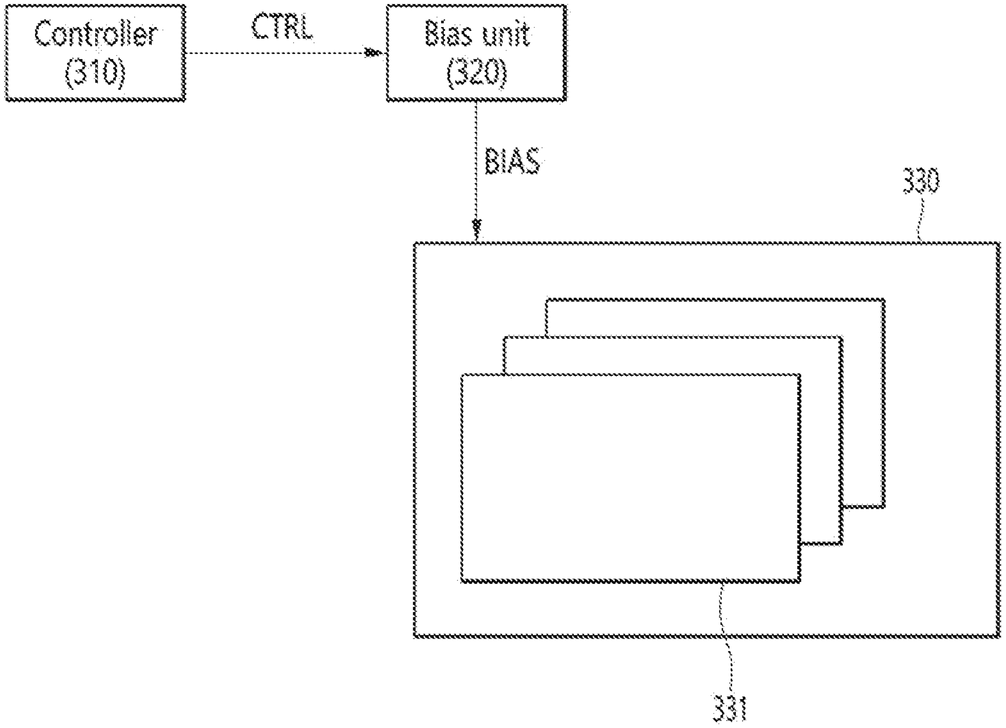
FIG. 3 is a schematic diagram for describing a configuration and operation of a driver, according to an embodiment.

FIG. 3 is a schematic diagram for describing a configuration and operation of a driver, according to an embodiment.

Referring to FIG. 3, a controller 310, a bias unit 320, and a driver 330 including one or more sub-drivers 331 are illustrated. In FIG. 3, the controller 310 may be a configuration corresponding to the controller 211 of FIG. 2, and the bias unit 320 may be a configuration corresponding to the bias unit 221 of FIG. 2, and the driver 330 may be a configuration corresponding to the driver 222 of FIG. 2.

In the disclosure, the driver 330 may control to supply power to one or more light-emitting elements. In an embodiment, the driver 330 may include one or more sub-drivers 331 respectively corresponding to one or more light-emitting elements. That is, the pixel according to the disclosure may include one or more light-emitting elements, and one sub-driver 331 may be configured to correspond to one light-emitting element.

In an embodiment, the driver 330 may control to supply power to one or more light-emitting elements based on data stored in a memory. In detail, the sub-driver 331 may control to supply power to the light-emitting element based on data stored in a memory. In detail, the sub-driver 331 may supply power to a light-emitting element based on video data stored in a video memory. In an embodiment, the sub-driver 331 may include a capacitor unit for charging power required for driving a light-emitting element, and the capacitor unit according to the disclosure will be described in detail later.

In the disclosure, the bias unit 320 may supply bias power to the driver 330, and specifically, the bias unit 320 may supply bias power to the sub-driver 331. To supply bias power to the sub-driver 331, the bias unit 320 may be connected to a terminal VCC through which a pixel driving circuit receives power.

In an embodiment, whether to supply power to the sub-driver 331 by the bias unit 320 may be controlled by a control signal CTRL output from the controller 310. In an embodiment, the control signal CTRL for controlling whether to supply power to the sub-driver 331 by the bias unit 320 may be output from the controller 310. In an embodiment, a function of controlling the operation of a capacitor by the controller 310 may be performed in a separate configuration from the controller 310, but is not limited thereto.

In an embodiment, power supplied by the bias unit 320 may be stored in a capacitor included in the sub-driver 331.

In an embodiment, the controller 310 may control whether to charge the capacitor based on capacitor data stored in a memory. In other words, the controller 310 may output the control signal CTRL based on the capacitor data stored in the memory to control whether to supply power by the bias unit 320 and whether to charge the capacitor.

Figure 4:
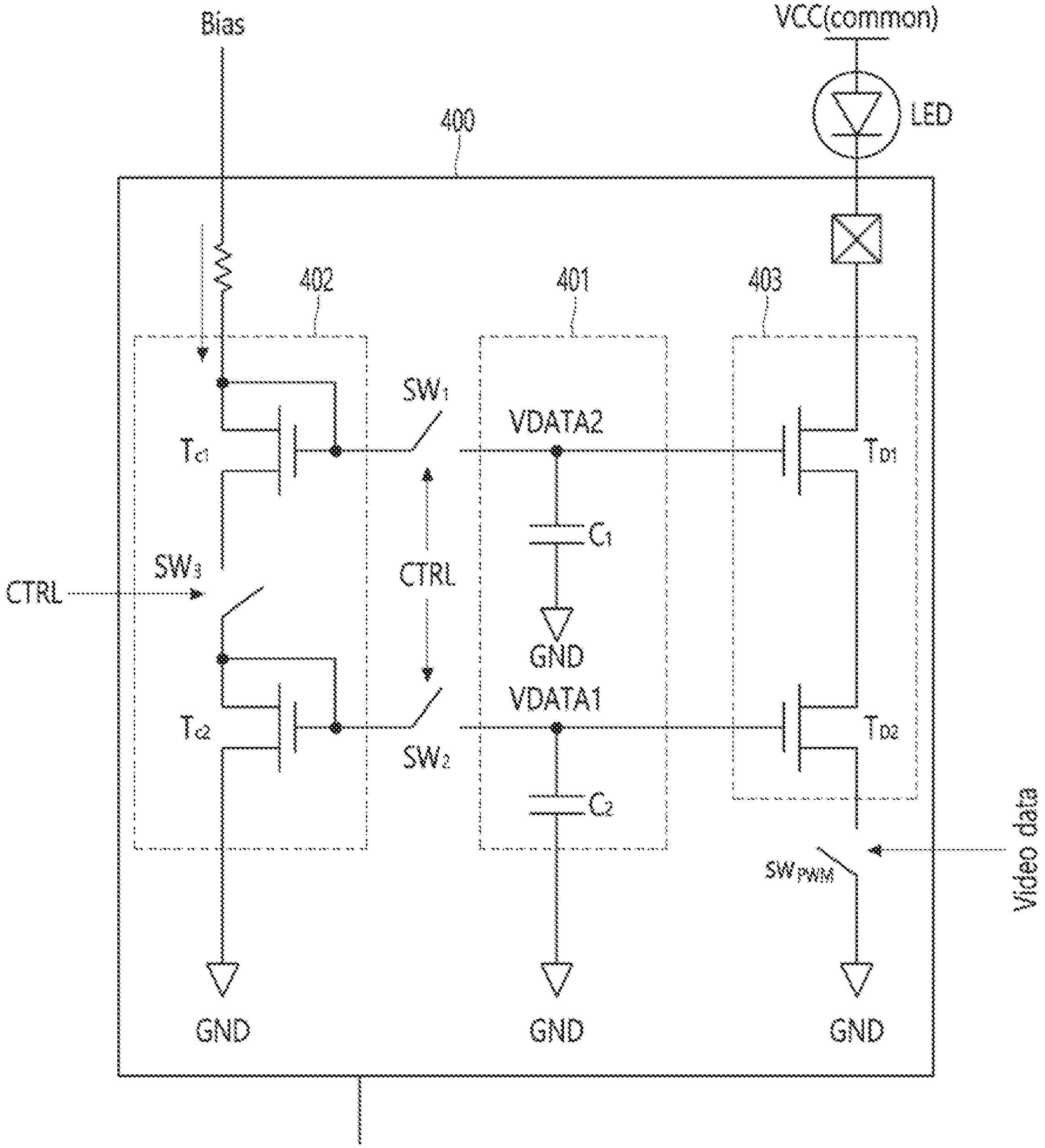
FIG. 4 is a circuit diagram for describing a configuration of a sub-driver according to an embodiment.

FIG. 4 is a circuit diagram illustrating a configuration of a sub-driver according to an embodiment.

Referring to FIG. 4, a sub-driver 400 according to an embodiment may include a capacitor unit 401, a charging unit 402, a discharging unit 403, and a switch unit SW. In FIG. 4, the sub-driver 400 may have a configuration corresponding to the sub-driver 331 of FIG. 3.

Referring to FIG. 4, the charging unit 402 may be connected between a pixel positive power source and a pixel negative power source. The discharge unit 403 may be connected between the pixel positive power source and the pixel negative power source. The capacitor unit 401 may be connected between the charging unit 402 and the discharging unit 403. The switch unit SW may be connected between the charging unit 402 and the capacitor unit 401. The switch unit SW may be turned on or off by a control signal CTRL output from a controller.

FIG. 4 illustrates an embodiment in which the capacitor unit 401 is configured with two capacitors, that is, a first capacitor $C_1$ and a second capacitor $C_2$. The first capacitor $C_1$ may be connected between a pixel negative power source GND and a first connection line connecting the charging unit 402 to the discharging unit 403. The second capacitor $C_2$ may be connected between the pixel negative power source and a second connection line connecting the charging unit 402 to the discharging unit 403. Here, the charging unit 402 may include a first charging transistor $T_{C1}$ and a second charging transistor $T_{C2}$ respectively connected to the first capacitor $C_1$ and the second capacitor $C_2$ between the pixel positive power source and the pixel negative power source. The discharge unit 403 may include a first discharge transistor $T_{D1}$ and a second discharge transistor $T_{D2}$ respectively connected to the first capacitor $C_1$ and the second capacitor $C_2$ between the pixel positive power source and the pixel negative power source. The switch unit SW may include a first switching element $SW_1$ connected between the first charging transistor $T_{C1}$ and the first capacitor $C_1$ and a second switching element $SW_2$ connected between the second charging transistor $T_{C2}$ and the second capacitor $C_2$. The switch unit SW may further include a third switching element $SW_3$ connected between the first charging transistor $T_{C1}$ and the second charging transistor $T_{C2}$. The sub-driver 400 may further include a PWM switching element $SW_{PWM}$ connected in series with the discharge unit 403 between the pixel positive power source and the pixel negative power source. The PWM switching element $SW_{PWM}$ may be turned on or off according to video data stored in a memory.

The sub-driver 400 of FIG. 4 is provided as an example, and the elements included in the sub-driver 400 and a circuit configuration according to connection of the elements may be configured differently from the embodiment illustrated in FIG. 4. For example, while the sub-driver 400 is illustrated as including a transistor which is an NMOSFET in FIG. 4, in another embodiment, the sub-driver 400 may include a transistor which is a PMOSFET, and in this embodiment, the first capacitor $C_1$ and the second capacitor $C_2$ may be connected to the terminal VCC for receiving power, instead of the pixel negative power source GND.

Figure 5:
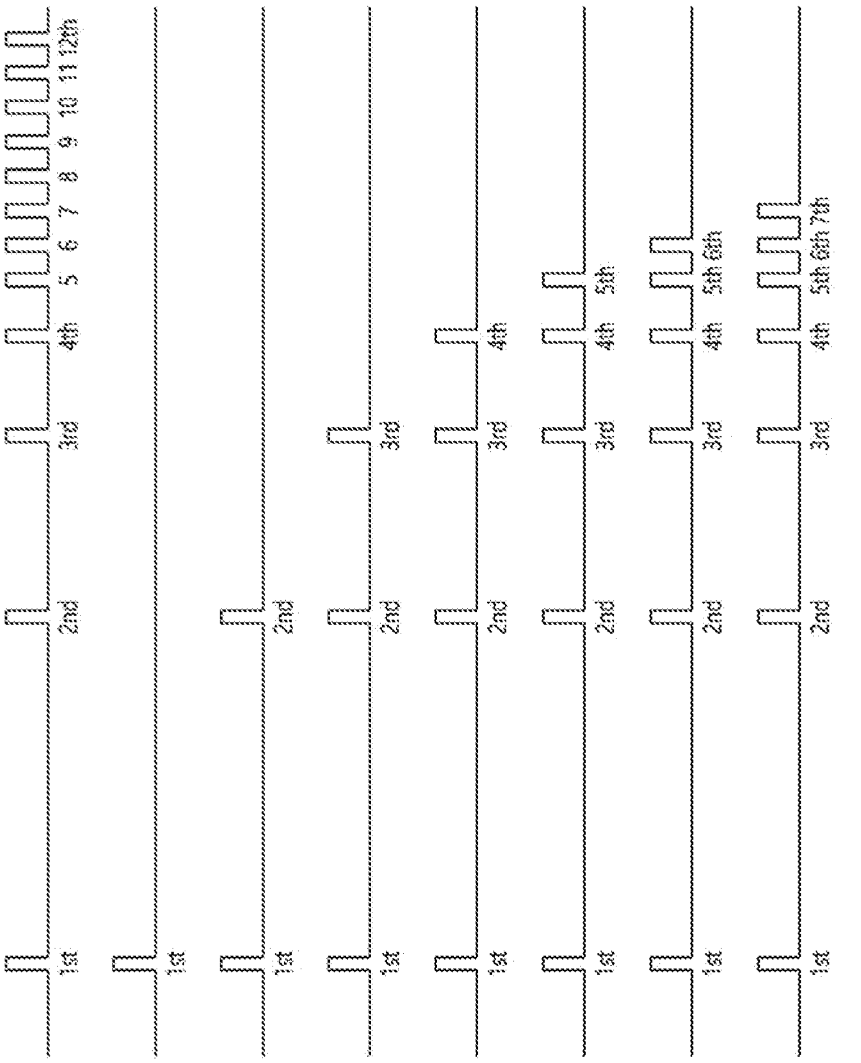
FIG. 5 is a diagram illustrating a number of times of charging a capacitor unit according to capacitor data, according to an embodiment.

FIG. 5 is a diagram illustrating the number of times of charging of a capacitor unit according to capacitor data, according to an embodiment.

Referring to FIG. 5, an example in which capacitor data 'Cap data' is 3-bits and video data is 12-bits stored in a memory is illustrated.

In the disclosure, the capacitor data may correspond to a maximum number of times the capacitor unit may be charged in one cycle (that is, a single frame). That is, the number of times of charging of the capacitor unit within a single frame may be defined based on the capacitor data.

Referring to FIG. 5, for example, when the capacitor data is <000>, a controller may output a control signal such that the capacitor unit is charged all twelve times within one cycle. When the capacitor data is <001>, the controller may output a control signal such that the capacitor unit is charged only once within one cycle. When the capacitor data is <010>, the controller may output a control signal such that the capacitor unit is charged twice within one cycle. When the capacitor data is <011>, the controller may output a control signal such that the capacitor unit is charged three times within one cycle. That is, a value of the capacitor data stored in the memory is related to a number of times the capacitor unit is charged during one cycle, and the controller may output, to the capacitor unit, a control signal for controlling the charging of the capacitor unit, based on the capacitor data stored in the memory. The example illustrated in FIG. 5, however, is provided for better understanding, and the number of bits of the capacitor data and the number of times of charging according to the capacitor data may be appropriately set in any manner.

Figure 6:
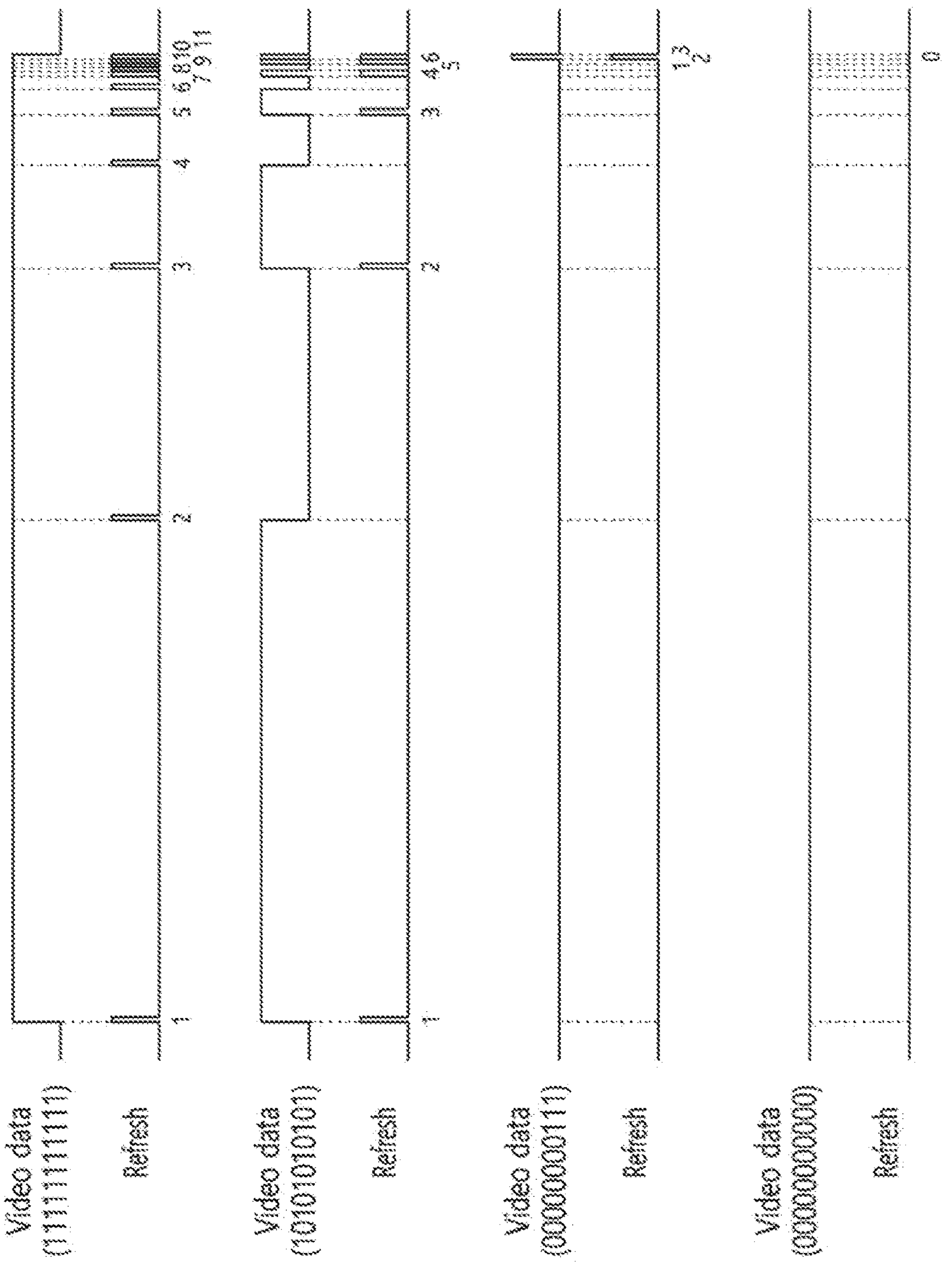
FIG. 6 is a diagram for describing control of whether to supply power by a bias unit, according to an embodiment.

FIG. 6 is a diagram for describing control of whether to supply power by a bias unit, according to an embodiment.

In the disclosure, as described above, a controller may control, through a control signal, whether to supply power by the bias unit.

In an embodiment, the controller may control the bias unit such that power is supplied by the bias unit only in a driving mode. As described above, a pixel driving circuit according to the disclosure may correspond to two modes, a data writing mode or a driving mode. The controller may operate (turn on) the bias unit only when the pixel driving circuit is in the driving mode, thereby reducing power consumption.

In an embodiment, when a capacitor unit is charged with bias power supplied by the bias unit, the controller may control the bias unit such that the bias unit stops supplying power. When the capacitor unit is charged, the operation of the bias unit may be restricted, thereby reducing power consumption.

In an embodiment, the controller may control the bias unit such that the bias unit stops supplying power when the capacitor unit is charged with bias power supplied by the bias unit, and that the bias unit supplies bias power only when a bit value of video data is 1. In other words, in the present embodiment, the controller may read video data stored in the memory, operate the bias unit only in response to video data having a bit value of 1, and limit the operation of the bias unit when the capacitor unit is charged with bias power. In the present embodiment, the controller may not operate the bias unit in response to video data having a bit value of 0. When a value of the video data is 0, there is no need to drive a light-emitting element, and accordingly, it is also not necessary to charge the capacitor unit. In the present embodiment, through the control of the operation of the bias unit, when the capacitor unit does not need to be charged, the bias power supply may be cut off, thereby reducing power consumption.

Referring to FIG. 6, a timing diagram for describing an embodiment in which the controller supplies bias power to the bias unit only when a value of the video data is 1 is shown.

For example, referring to FIG. 6, when video data is (11111111111), all video data have a bit value of 1, and thus, the controller may operate the bias unit in response to all bits of the video data.

Referring to FIG. 6, when video data is (10101010101), the controller may operate the bias unit only in response to video data having a bit value of 1. On the other hand, in response to video data having a bit value of 0, as described above, there is no need to drive a light-emitting element, and thus, a capacitor unit is not charged. According to the present embodiment, by cutting off the supply of bias power necessary for charging the capacitor unit, it is implemented that the capacitor unit is not charged.

FIG. 6 shows that, even when the video data is (00000000111), the capacitor unit is not charged in response to video data having a bit value of 0.

Referring to FIG. 6, when the video data is (00000000000), all video data values have a value of 0, and thus, the controller may not operate the bias unit in response to all bits of the video data, and accordingly, the capacitor unit is not charged in response to all bits.

Figure 7:
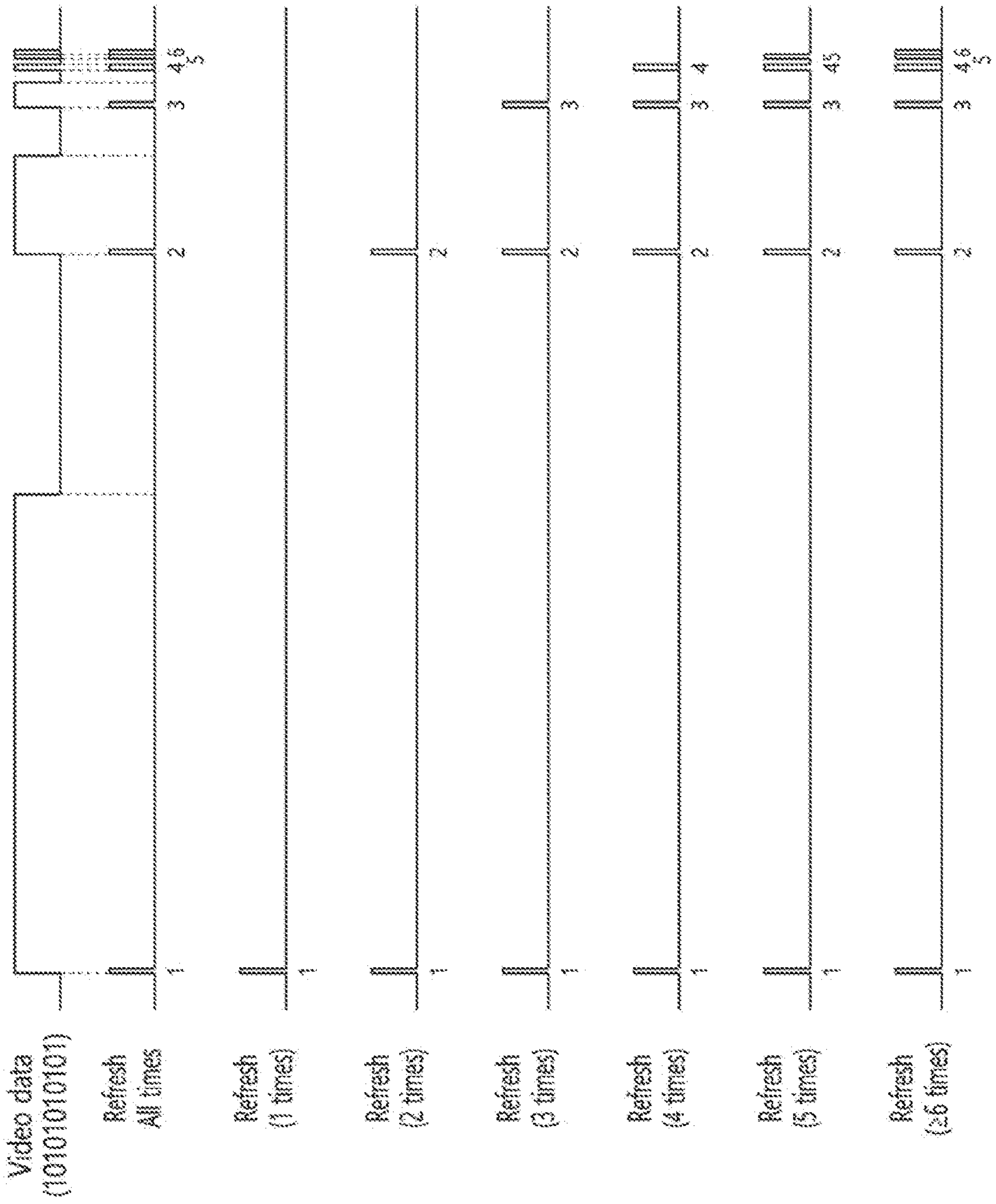
FIG. 7 is a diagram for describing power supply control by a bias unit when a number of times of charging is defined, according to an embodiment.

FIG. 7 is a diagram for describing power supply control according to a bias unit when the number of times of charging is defined, according to an embodiment.

As described above with reference to FIG. 5, the number of times of charging the capacitor unit within a single frame may be defined based on capacitor data, and as described above with reference to FIG. 6, the controller may operate the bias unit only in response to video data having a bit value of 1.

In an embodiment, when the number of times of charging is defined, the controller may supply bias power only when the bit value of the video data is 1, and when the capacitor is charged with bias power, the controller may control the bias unit such that the bias unit stops supplying power, and that bias power supply is performed only as many times as a number of times of charging within a single frame. In detail, the controller may operate the bias unit only in response to the video data having a bit value of 1, and the number of times the bias unit is operated within a single frame may be limited. That is, when the number of bits included in video data and having a value of 1 within a single frame exceeds the number of times of charging, the controller may control the operation of the bias unit such that the capacitor unit is charged in response to, among bits of the video data having a bit value of 1, some bits corresponding to the number of times of charging, and that the capacitor unit is not charged in response to the remaining bits of the video data. Preferably, the bias unit may be operated in response to a bit value of 1 with respect to higher bits, and when the number of times of operating the bias unit reaches the defined number of times of charging within a single frame, the bias unit may not be operated with respect to lower bits thereafter. In the present embodiment, power consumption may be reduced by the controller cutting off bias power supply with respect to bits exceeding the number of times of charging.

Referring to FIG. 7, when video data is (10101010101), a timing diagram for describing an embodiment of charging the capacitor unit according to various numbers of charging times is shown.

Referring to FIG. 7, an example in which the number of times of charging is not defined or the capacitor unit is defined to be charged with respect to all bits of video data, the bits having a bit value of 1, within a single frame (All times) is illustrated. As illustrated, when the number of times of charging is not defined or the capacitor unit is defined to be charged for all bits of video data within a single frame, the controller may control such that the capacitor unit is charged in response to all bit values of video data being 1. In other words, the controller may control the bias unit such that the bias power supply is performed in response to all video data having a bit value of 1 within a single frame.

Referring to FIG. 7, an example is illustrated, in which, when the number of times of charging is defined as 1, the capacitor unit is charged with respect to only one of bits of video data, the bits having a bit value of 1, within a single frame. As illustrated, when the number of times of charging is defined as 1, the controller may allow the capacitor unit to be charged in response to only one of bits of the video data, the bits having a bit value of 1. In other words, the controller may control the bias unit such that bias power is supplied only once within the single frame.

Similarly, referring to FIG. 7, an example is illustrated, in which, when the number of times of charging is defined as K, the capacitor unit is charged only for K bits among bits of video data, the bits having a bit value of 1 within a single frame. As illustrated, when the number of charging is defined as K, the controller may allow the capacitor unit to be charged in response to only K bits among the bits of the video data having a bit value of 1. That is, in the example illustrated in FIG. 7, within a single frame, there are six bits having a bit value of 1 among the video data, but as the number of times of charging is defined as K, the capacitor unit may be charged in response to only K bits among the six bits, and may not be charged in response to the remaining bits except for the K bits. In other words, the controller may control the bias unit such that bias power is supplied at most K times within a single frame.

Referring to FIG. 7, in the example illustrated in FIG. 7, six bits of the video data have a bit value of 1 within a single frame, and thus, when the number of times of charging is defined as 6 or more, the capacitor unit may be charged in response to all bits having a bit value of 1.

In the example illustrated in FIG. 7, when the number of times of charging is defined, the capacitor unit may be charged preferentially in response to, among bits of the video data having a bit value of 1, higher bits, but this is provided as an example, and any suitable method may be applied here.

The video data illustrated in FIG. 7 is provided as an example, and it will be obvious to those skilled in the art that the method according to the disclosure may be applied to video data including a number of bits, a bit value, and a number of bits having a bit value of 1 in any single frame.

In an embodiment, the number of times of charging the capacitor unit within a single frame of may be defined by a user.

Hereinafter, a method of outputting a reference voltage to a memory, and writing data, according to the disclosure, is described.

Figure 8:
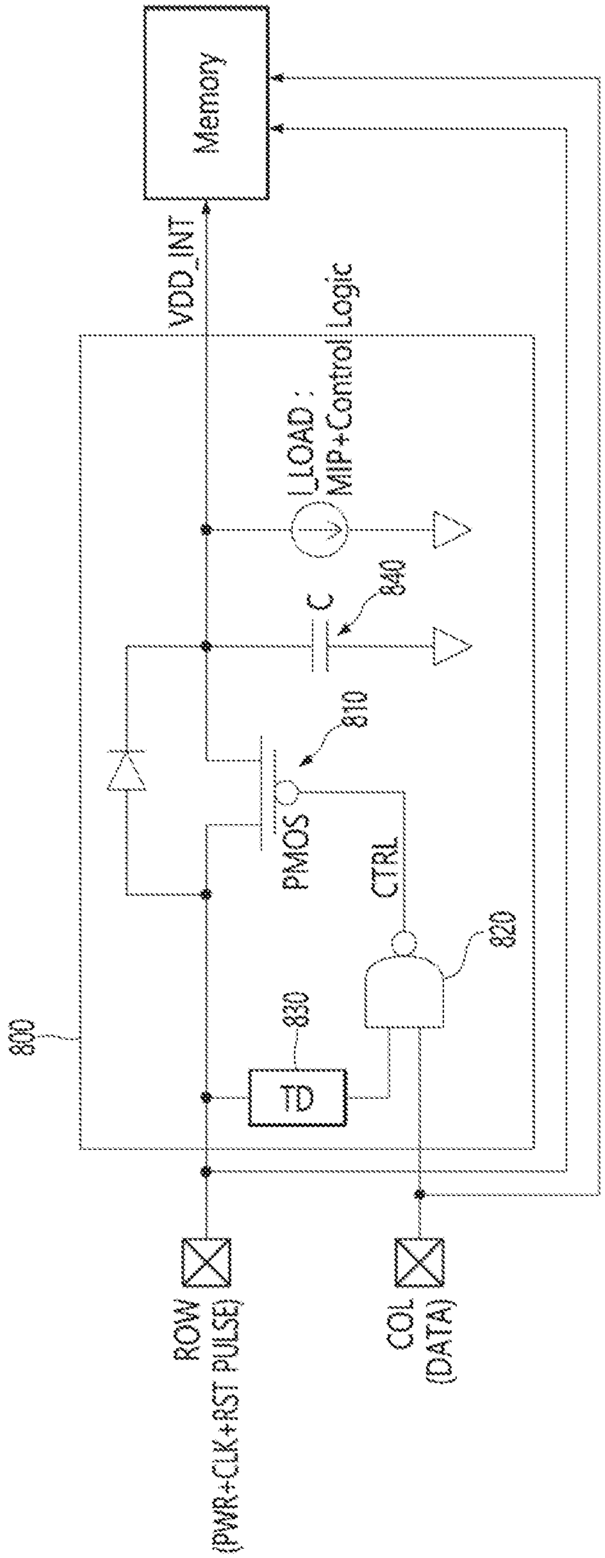
FIG. 8 is a circuit diagram of a power generator according to an embodiment.

FIG. 8 is a circuit diagram of a power generator according to an embodiment.

As described above, a pixel driving circuit according to an embodiment may include a power generator. The power generator may output a reference voltage to a memory based on a row signal output from a scan driving circuit and a column signal output from a data driving circuit.

Referring to FIG. 8, a power generator 800 according to an embodiment may include a transistor 810, a NAND gate 820, and a time delay element 830. The power generator 800 may be connected to an input terminal ROW of a row signal and an input terminal COL of a column signal to receive the row signal and the column signal. Also, the power generator 800 may include a reference voltage output terminal for outputting a reference voltage VDD_INT to a memory.

The transistor 810 may be arranged between the input terminal of the row signal and the reference voltage output terminal. According to an embodiment, the transistor 810 may be a PMOSFET. A drain terminal and a source terminal of the PMOSFET may be connected to an input terminal of a row signal and the reference voltage output terminal, and a gate terminal of the PMOSFET may be connected to a signal output terminal of a NAND gate. For reference, the PMOSFET is turned off when a signal input to the gate terminal thereof is logic high ('1'), and is turned on when a signal input to the gate terminal thereof is logic low ('0').

The NAND gate 820 may be arranged between an intermediate terminal (gate terminal) of the transistor 810 and the input terminal of a column signal. The NAND gate 820 is a logic circuit element and may have two input terminals and one output terminal. A column signal may be input to one of the two input terminals of the NAND gate 820 and a delayed row signal may be input to the other. For reference, the NAND gate 820 outputs a logic low only when inputs are all logic high ([1,1]), and outputs logic high in other cases ([0,0], [1,0], [0,1]).

The time delay element 830 may be arranged between the input terminal of a row signal and the NAND gate. The time delay element 830 may receive the row signal, delay the row signal by a preset period of time, and output the delayed row signal to any one of the input terminals of the NAND gate 820. As an example, the period of delay time may be 0.5 ns to 1 ns.

Figure 9:
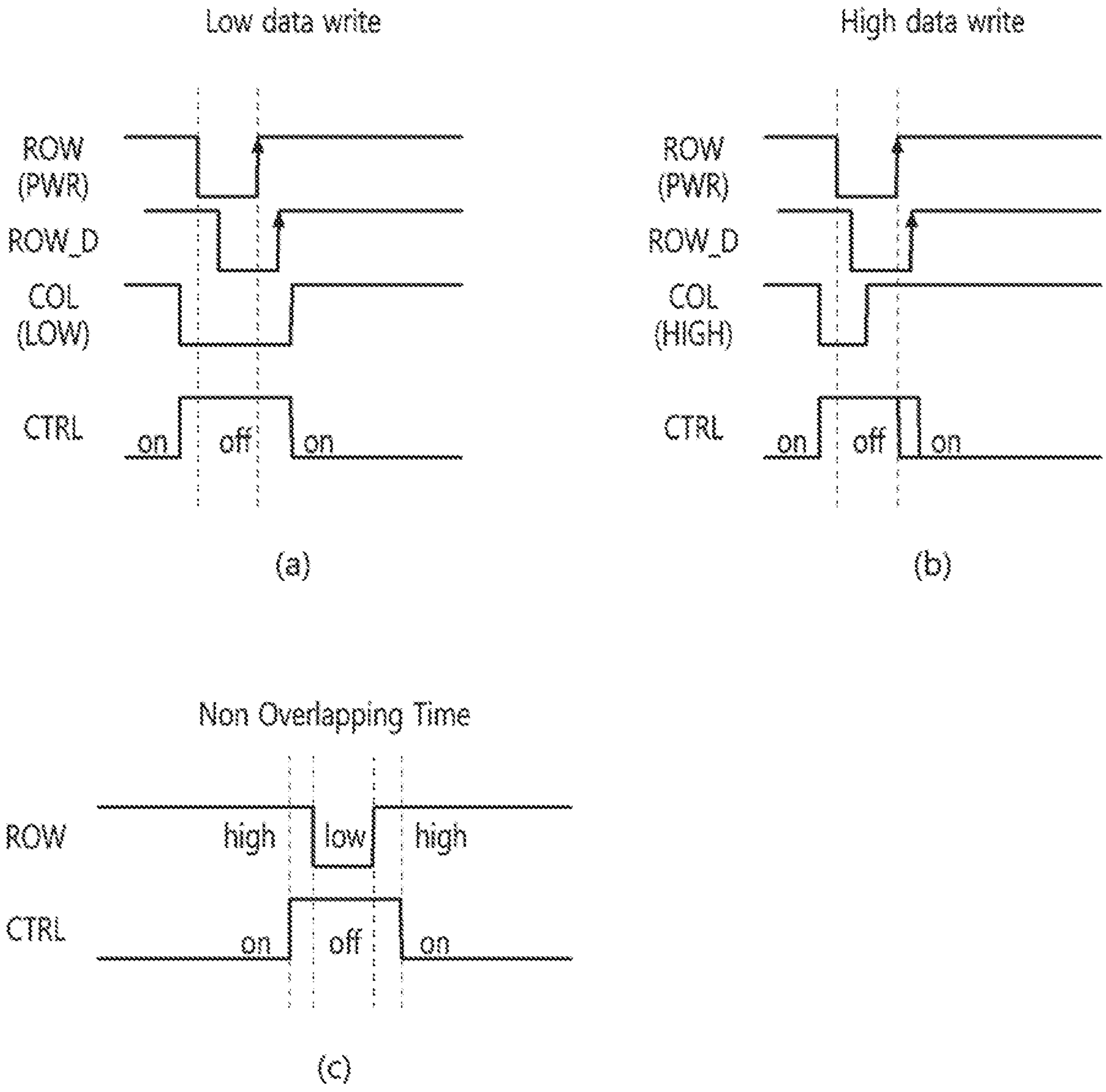
FIGS. 9A-9C are timing diagrams illustrating a power generator according to the disclosure, which outputs a reference voltage by using a row signal and a column signal.

FIGS. 9A-9C are timing diagrams illustrating a power generator according to the disclosure, which outputs a reference voltage by using a row signal and a column signal.

Referring to FIGS. 9A-9C, 'ROW' denotes a row signal input through an input terminal of the row signal, 'ROW_D' denotes a row signal that is delayed by passing a time delay element (e.g., the time delay element 830 of FIG. 8), 'COL' denotes a column signal input through an input terminal of the column signal, and 'CTRL' denotes a signal output from a NAND gate (e.g., the NAND gate 820 of FIG. 8).

First, the row signal may have the characteristics of changing from a logic high state to a logic low state, maintaining the logic low state for a preset period of time, and then changing back to the logic high state. The column signal may also have the characteristic of changing from a logic high state to a logic low state, maintaining the logic low state for a preset period of time, and then changing back to the logic high state. Here, the column signal may change from the logic high state to the logic low state earlier, slightly before the row signal enters the logic low state. In addition, the column signal may have a time difference in maintaining the logic low state between when data to be input to the memory is logic low ('0') and when data to be input to the memory is logic high ('1'). For logic low ('0') data, the column signal may change from logic low to logic high after the row signal is changed to logic high (see FIG. 9A). For logic high ('1') data, the column signal may change from logic low to logic high before the row signal is changed to logic high (see FIG. 9B).

The NAND gate may change from logic low to logic high and then back to logic low according to timings of the delayed row signal and the column signal. As described above, a transistor (e.g., the transistor 810 and PMOSFET of FIG. 8) may be turned on by a logic row signal, turned off by a logic high signal, and then turned on again by a logic row signal.

Referring to FIG. 9C, when the row signal ROW is logic high, the transistor is in an on state, and thus the reference voltage VDD_INT may be output to the reference voltage output terminal. On the other hand, the transistor is in an off state when the row signal ROW is logic low, and thus, the reference voltage VDD_INT of the reference voltage output terminal may be maintained. To this end, the power generator (e.g., the power generator 800 of FIG. 8) may further include a capacitor arranged between the reference voltage output terminal and circuit ground (e.g., the capacitor 840 of FIG. 8). As the transistor is in an off state, the capacitor may have a function of maintaining the reference voltage VDD_INT of the reference voltage output terminal.

Figure 10:
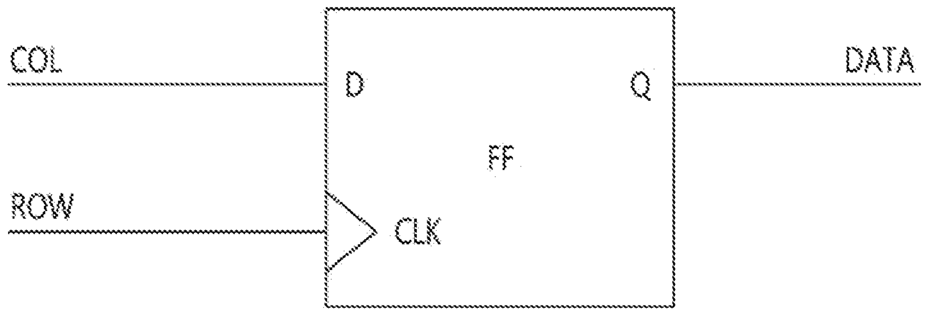
FIG. 10 is a block diagram schematically illustrating a configuration of a conventional flip-flop.

FIG. 10 is a block diagram schematically illustrating a configuration of a conventional flip-flop.

Referring to FIG. 10, a column signal may be input to a data signal input terminal D of a flip-flop FF, and a row signal may be input to a clock signal input terminal CLK. Referring to FIG. 9A, when the column signal is in the logic low state at the moment when the row signal changes from logic low to logic high (rising edge), logic low data ('0') may be input to the flip-flop FF. Also, referring to FIG. 9B, when the column signal is in the logic high state at the moment when the row signal is changed from the logic low to the logic high (rising edge), logic high data ('1') may be input to the flip-flop FF. That is, in the disclosure, reference power may be output from the power generator based on timing of the row signal and the column signal, and capacitor data or video data may be simultaneously input using the same signal. Although the disclosure has been described as an example in which the memory of the disclosure includes a plurality of flip-flops, the disclosure is not limited thereto.

Meanwhile, as described above, the pixel driving circuit according to the disclosure may further include a reset unit that outputs a reset signal RSTB for initializing data stored in the memory, to the memory.

Figure 11:
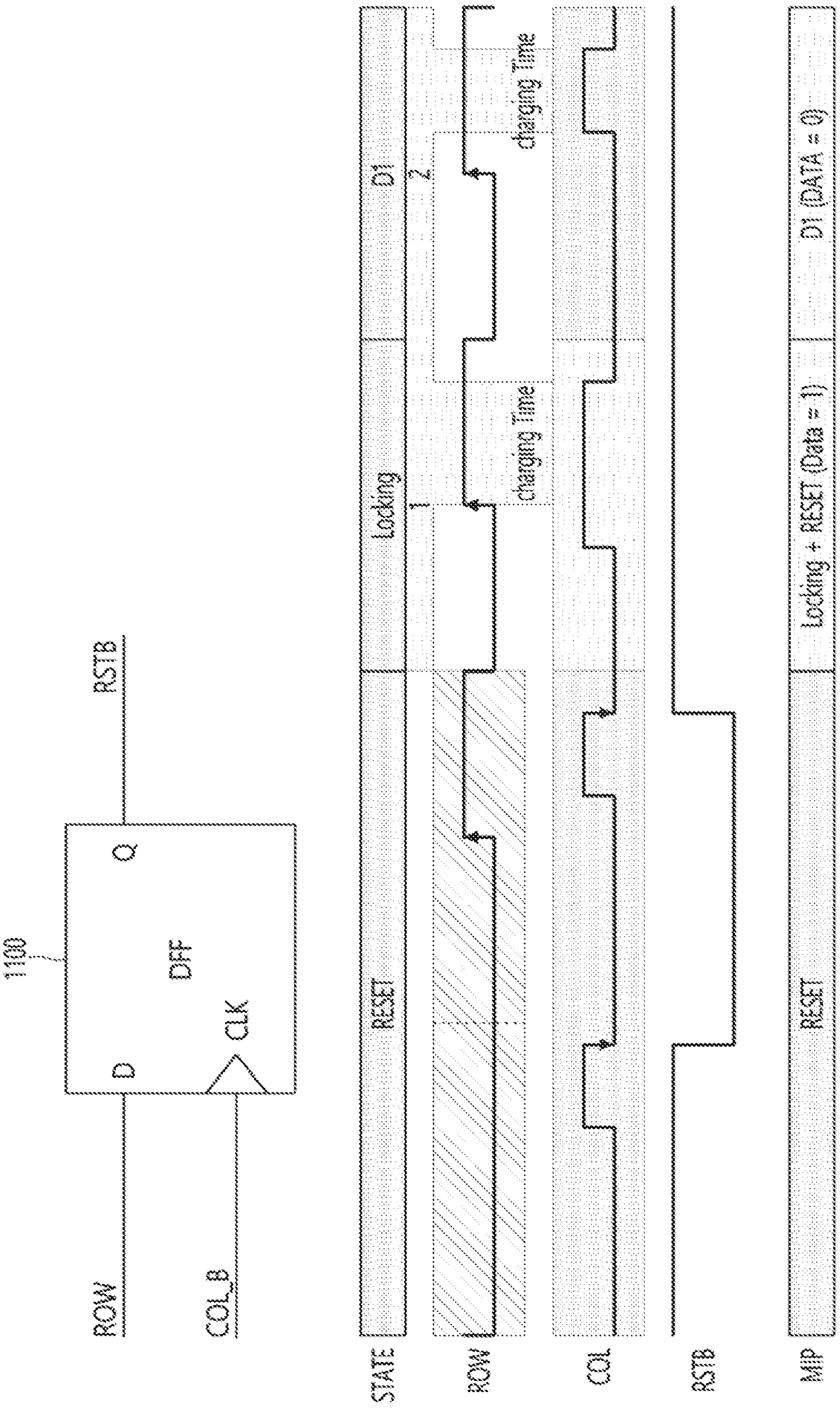
FIG. 11 is a timing diagram of a row signal and a column signal in a video data reset period, according to an embodiment.

FIG. 11 is a timing diagram of a row signal and a column signal in a video data reset period, according to an embodiment.

Referring to FIG. 11, a reset unit 1100 may have a data signal input terminal D to which a row signal is input, a clock signal input terminal CLK to which a column signal is input, and a signal output terminal Q from which a reset signal RSTB is output. The column signal input to the clock signal input terminal CLK may be input in a state in which the column signal output from a data driving circuit is inverted. Accordingly, the reset unit 1100 may further include a signal inverter (not shown) for inverting a signal input to the clock signal input terminal CLK to invert the column signal.

In a video data reset period RESET, a scan driving circuit may output a row signal maintaining a logic low state for a longer period of time than a reference interval. In the video data reset period RESET, the data driving circuit may output a column signal that changes from logic high to logic low while the row signal maintains the logic low state. In the disclosure, the reset signal RSTB may initialize data stored in the memory at logic low ('0'). Thus, it should be understood that the reset signal RSTB illustrated in FIG. 11 is a signal in a state in which the column signal is not inverted.

Figure 12:
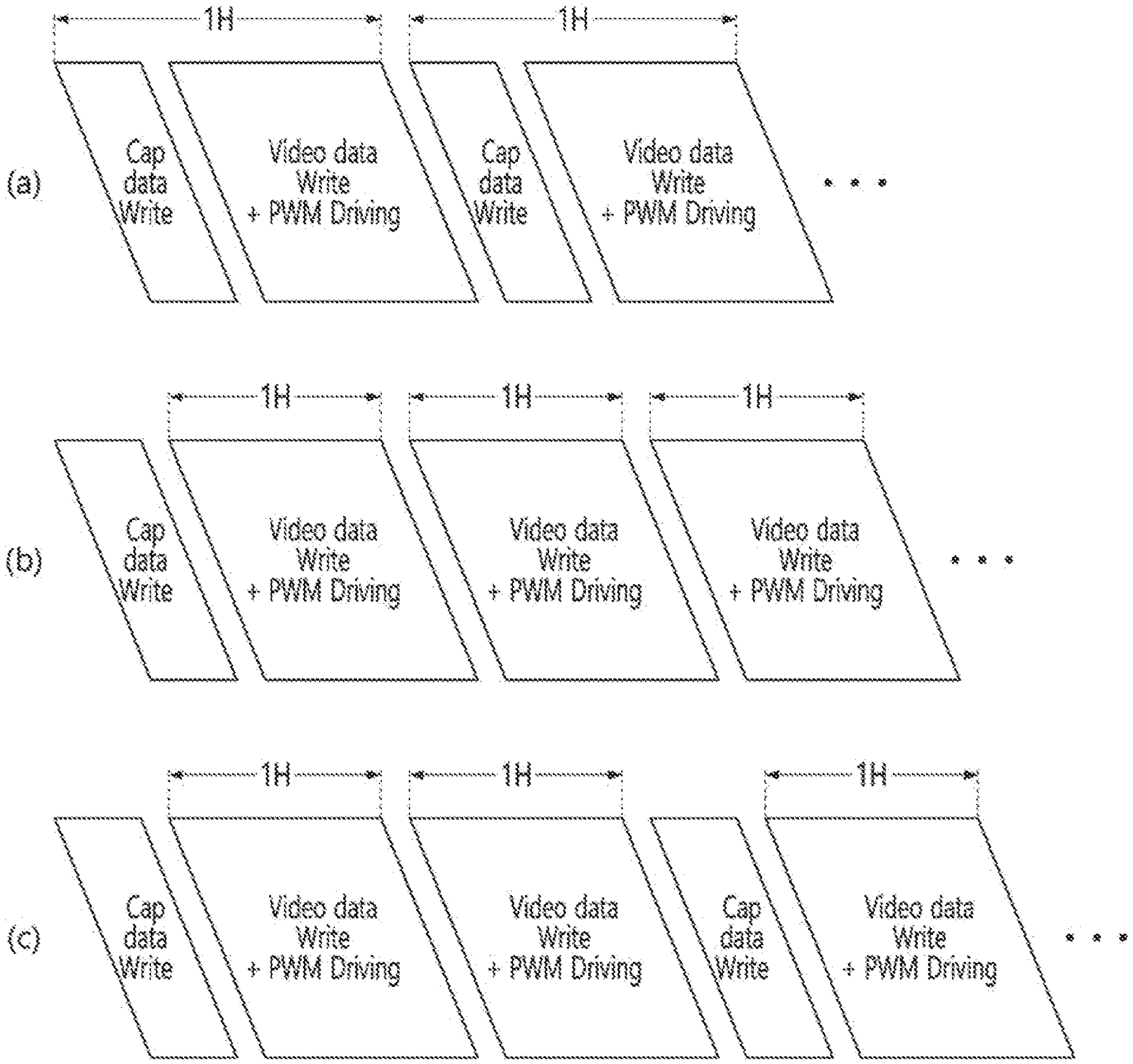
FIGS. 12A-12C show diagrams illustrating a writing period and a pulse width modulation (PWM) driving period of capacitor data and video data, according to the disclosure.

FIGS. 12A-12C show diagrams illustrating a writing period and a PWM driving period of capacitor data and video data, according to the disclosure.

Referring to FIG. 12A, in an embodiment, a row signal and a column signal may include a capacitor data writing period, a video data writing period, and PWM driving period for every one cycle (1H). That is, capacitor data may be newly input at every cycle.

Referring to FIG. 12B, in another embodiment, a row signal and a column signal may be signals including one capacitor data writing period, and a video data writing period and a PWM driving period for every one cycle (1H). That is, the present embodiment relates to a case in which capacitor data is not changed without additional control after being input only once for the first time.

Referring to FIG. 12C, in another embodiment, a row signal and a column signal may be signals including a capacitor data writing period for every preset cycle, and a video data writing period and a PWM driving period, which are repeated for every one cycle (1H). That is, capacitor data may be newly input at regular intervals.

In the embodiments described above, the cycle H may correspond to one frame, or may be a pre-divided interval within one frame.

The scan driving circuit and the data driving circuit described above may include a processor, an application-specific integrated circuit (ASIC), another chipset, a logic circuit, a register, a communication modem, or a data processing device and the like, which are known in the art to execute various control logic described above. In addition, when the above-described control logic is implemented in software, the scan driving circuit and the data driving circuit may be implemented as a set of program modules. The program modules may be stored in a memory device and executed by the processor.

For a computer to read a program and execute methods implemented with the program, the program may include code written in computer language, such as C/C++, C #, JAVA, Python, and machine language that the computer's processor (CPU) can read through a device interface of the computer. The code may include functional code related to a function defining functions necessary for executing the methods, and may control code related to an execution procedure required for the processor of the computer to execute the functions in a certain procedure. In addition, the code may further include additional information necessary for the processor of the computer to execute functions or code related to memory reference regarding which location (address number) in an internal or external memory of the computer should be referenced. In addition, when the processor of the computer needs to communicate with any other remote computer or server to execute functions, the code may further include code related to communication, as to how to communicate with any other remote computer or server by using a communication module of the computer, or which information or media should be transmitted and received during communication.

A storage medium in which a program is stored is not a medium that stores data for a short moment, such as a register or a cache memory, but a medium that stores data semi-permanently and can be read by a device. Examples of the storage medium include a read-only memory (ROM), random access memory (RAM), compact-disc ROM (CD-ROM), a magnetic tape, a floppy disk, and an optical data storage device, but are not limited thereto. That is, the program may be stored in various recording media on various servers that the computer can access or in various recording media on a computer of the user. In addition, the storage medium may be distributed in computer systems connected through a network, and computer-readable codes may be stored in a distributed manner.

By reducing the number of times of charging a capacitor, power consumed to drive pixels may be reduced.

In addition, by selectively supplying bias power required for charging of the capacitor, power consumed to drive pixels may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel driving circuit comprising:

a first circuit including a memory and a controller, and configured to control, in a data writing mode, a signal related to driving of one or more luminous elements; and a second circuit including a driver and a bias unit, and configured to supply, in a driving mode, power to the one or more luminous elements based on a signal transmitted from the first circuit, wherein the driver includes a capacitor configured to receive bias power from the bias unit and supply the bias power to the one or more luminous elements, wherein the memory includes a first memory configured to store video data related to the driving of the one or more luminous elements and a second memory configured to store capacitor data related to charging of the capacitor, wherein the controller outputs a control signal corresponding to the video data and the capacitor data, wherein the controller controls whether to supply the bias power by the bias unit, by controlling the bias unit such that the bias unit supplies power to the capacitor only when the video data has a bit value of 1, and the bias unit stops supplying power when the capacitor is charged with the bias power, wherein, when a number of times of charging is defined as K, the controller controls the bias unit such that bias power supply is performed at most K times within a single frame, and wherein the number of times of charging is user-definable.

2. The pixel driving circuit of claim 1, wherein the driver comprises one or more sub-drivers corresponding to the one or more luminous elements, respectively.

* * * * *